(12) United States Patent
Shiau et al.

(10) Patent No.: US 11,379,396 B2
(45) Date of Patent: *Jul. 5, 2022

(54) MEMORY CARD ACCESS MODULE AND MEMORY CARD ACCESS METHOD

(71) Applicant: REALTEK SEMICONDUCTOR CORPORATION, Hsinchu (TW)

(72) Inventors: Jiunn-Hung Shiau, Taipei (TW); Neng-Hsien Lin, Kaohsiung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,313

(22) Filed: May 27, 2020

(65) Prior Publication Data

US 2020/0285598 A1 Sep. 10, 2020

Related U.S. Application Data

(63) Continuation-in-part of application No. 15/855,182, filed on Dec. 27, 2017, now Pat. No. 10,706,000.

(30) Foreign Application Priority Data

Mar. 22, 2017 (TW) .................................. 106109480

(51) Int. Cl.
*G06F 13/42* (2006.01)
*G06F 13/38* (2006.01)
(Continued)

(52) U.S. Cl.
CPC .......... *G06F 13/385* (2013.01); *G06F 13/387* (2013.01); *G06F 13/409* (2013.01);
(Continued)

(58) Field of Classification Search
USPC ...... 710/38, 62–74, 301–302, 11, 13, 15–16, 710/62–74, 105, 305–306, 313–317;
(Continued)

(56) References Cited

U.S. PATENT DOCUMENTS

| 2005/0160214 A1* | 7/2005 | Sauber | G06F 13/385 |
| | | | 710/315 |
| 2006/0212640 A1* | 9/2006 | Lee | G06F 13/385 |
| | | | 710/315 |

(Continued)

OTHER PUBLICATIONS

"SD Specifications Part 1 Physical Layer Simplified Specification", Apr. 10, 2017, SD Card Association, Version 6.00.*

*Primary Examiner* — Ilwoo Park
(74) *Attorney, Agent, or Firm* — WPAT, PC

(57) ABSTRACT

A memory card access module and a memory card access method are provided. The memory card access method is applied to an electronic device. A processing unit of the electronic device accesses a memory card through a memory card slot. The method includes steps of: detecting whether the memory card supports a Peripheral Component Interconnect Express (PCIe) interface; when the memory card does not support the PCIe interface, controlling the processing unit to access the memory card through a data transmission path and performing data format conversion between a transmission interface and the PCIe interface using a memory card access unit disposed on the data transmission path; and when the memory card supports the PCIe interface, controlling the processing unit to access the memory card through a PCIe data transmission path that allows the processing unit and the memory card to transmit data through the PCIe interface.

20 Claims, 11 Drawing Sheets

(51) Int. Cl.
*G06F 13/40* (2006.01)
*G06K 19/077* (2006.01)

(52) U.S. Cl.
CPC . *G06K 19/07732* (2013.01); *G06K 19/07741* (2013.01); *G06F 2213/0026* (2013.01)

(58) Field of Classification Search
USPC .......................................................... 326/30
See application file for complete search history.

(56) References Cited

U.S. PATENT DOCUMENTS

| | | |
|---|---|---|
| 2009/0279889 A1 | 11/2009 | Kirkpatrick et al. |
| 2010/0049878 A1 | 2/2010 | Yu et al. |
| 2011/0072185 A1* | 3/2011 | Pinto .................... G06F 3/0607 710/315 |
| 2012/0217977 A1* | 8/2012 | Gao ...................... G06F 11/221 324/543 |
| 2013/0151750 A1 | 6/2013 | Kanigicherla et al. |
| 2014/0173159 A1* | 6/2014 | Tsai ...................... G06F 13/385 710/305 |
| 2014/0280960 A1 | 9/2014 | Paramasivam et al. |
| 2016/0306724 A1* | 10/2016 | Fluet .................. G06F 11/2733 |

\* cited by examiner

MEMORY CARD ACCESS MODULE AND MEMORY CARD ACCESS METHOD

CROSS REFERENCE

The present application is a continuation-in-part of U.S. patent application Ser. No. 15/855,182, which was filed Dec. 27, 2017, the disclosure of which is hereby incorporated by reference in its entirety.

BACKGROUND OF THE INVENTION

1. Field of the Invention

The present invention generally relates to a Peripheral Component Interconnect Express (PCI-Express, PCIe for short) interface, and, more particularly, to PCIe memory cards.

2. Description of Related Art

FIG. 1 is a block diagram showing a memory card connected to a conventional electronic device. The electronic device 10 (e.g., a desktop computer, a laptop computer, a tablet, a mobile phone, etc.) includes a processing unit 110, a memory card access unit 130, and a memory card slot 150. The processing unit 110 accesses the memory card 15 inserted in the memory card slot 150 through the memory card access unit 130. The transmission interface 120 between the processing unit 110 and the memory card access unit 130 is, for example, a common PCIe interface. The transmission interface 140 between the memory card access unit 130 and the memory card 15 is, for example, a common secure digital (SD) interface. The main function of the memory card access unit 130 is to provide data format conversion between the PCIe interface and the SD interface.

Since the PCIe interface becomes more prevalent nowadays, the memory card 15 may adopt a PCIe interface in the future and can accordingly communicate with the processing unit 110 directly; in other words, it is not necessary for the memory card 15 to communicate with the processing unit 110 through the memory card access unit 130. However, during the transition between modern memory cards (PCIe memory cards) and old-fashioned memory cards (SD memory cards), the manufacturer of the electronic device 10 very likely designs the electronic device 10 to have the capability of reading both kinds of memory cards. Unfortunately, since the processing unit 110 provides only a limited number of PCIe lanes, if the manufacturer of the electronic device 10 allocates the PCIe lanes of the processing unit 110 to SD memory cards, which are accessed through the memory card access unit 130, and PCIe memory cards, which are directly accessed, the support for other peripherals of the electronic device 10 will be sacrificed. For example, the peripherals may include display cards, wireless communication modules (e.g., WIFI, Long Term Evolution (LTE), Bluetooth, etc.), wired communication modules (e.g., Ethernet), storage devices (e.g., a solid-state drive), universal serial bus (USB) control modules, etc.

In addition, when the electronic device 10 supports both the old-fashioned memory cards and the modern memory cards at the same time, the user must identify the type of the memory card before inserting the memory card in the memory card slot 150, causing inconvenience in use. Further, when the processing unit 110 accesses the memory card 15 directly, the data transmission performance may be degraded, or an access error may even occur due to poor contact between the memory card 15 and the memory card slot 150.

SUMMARY OF THE INVENTION

In view of the issues of the prior art, an object of the present invention is to provide a memory card access module and a memory card access method, so as to make an improvement to the prior art.

A device is provided. The device is coupled between a processing unit and a memory card slot and used for accessing a memory card. The device includes a selection unit, a data transmission path between the selection unit and the memory card slot, a Peripheral Component Interconnect Express (PCIe) data transmission path between the selection unit and the memory card slot, a memory card access unit, and a control unit which is coupled to the memory card access unit and the selection unit. The memory card access unit is disposed on the data transmission path and configured to access the memory card and to provide data format conversion between a transmission interface and a PCIe interface. The control unit performs the following steps: determining whether the memory card supports the PCIe interface; controlling the selection unit to connect the processing unit and the memory card through the PCIe data transmission path rather than the data transmission path when the memory card supports the PCIe interface; and controlling the selection unit to connect the processing unit and the memory card through the data transmission path rather than the PCIe data transmission path when the memory card does not support the PCIe interface.

A memory card access method is also provided. The method is applied to an electronic device. The processing unit of the electronic device is able to access a memory card via a memory card slot, and the electronic device includes a data transmission path and a PCIe data transmission path. The method includes the following steps: detecting whether the memory card supports a PCIe interface; connecting the processing unit and the memory card through the PCIe data transmission path rather than the data transmission path when the memory card supports the PCIe interface; connecting the processing unit and the memory card through the data transmission path on which a memory card access unit is disposed rather than the PCIe data transmission path when the memory card does not support the PCIe interface; and controlling the memory card access unit to conduct data format conversion between a transmission interface and the PCIe interface when the memory card does not support the PCIe interface.

The memory card access module and the memory card access method of the present invention enable an electronic device to share a same PCIe interface by directly accessing the PCIe devices (e.g., an SD memory card that supports the PCIe interface) or indirectly accessing the non-PCIe devices (e.g., an SD memory card that does not support the PCIe interface) through the same PCIe interface, thereby reducing the number of the PCIe lanes in use. When applied to the access of the PCIe memory cards, the present invention provides a user-friendly interface. In addition, circuits associated with signal transmission enhancement can also be added to the present invention to improve memory card access performance and reduce the chance of access errors. Compared with a conventional PCIe switch which is costly and complex as a result of providing multiple active data transmission paths at the same time through which data are routed to realize interface sharing, the present invention achieves the purpose of sharing a PCIe interface with a simple circuit (e.g., a multiplexer) which has only one active data transmission path at a time, thereby not only saving costs but also reducing the difficulty of circuit design.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a memory card access module and a memory card access method. On account of that some or all elements of the memory card access module could be known, the detail of such elements is omitted provided that such detail has little to do with the features of this disclosure and this omission nowhere dissatisfies the specification and enablement requirements. People of ordinary skill in the art can choose components or steps equivalent to those described in this specification to carry out the present invention, which means that the scope of this invention is not limited to the embodiments in the specification.

Figure 1:
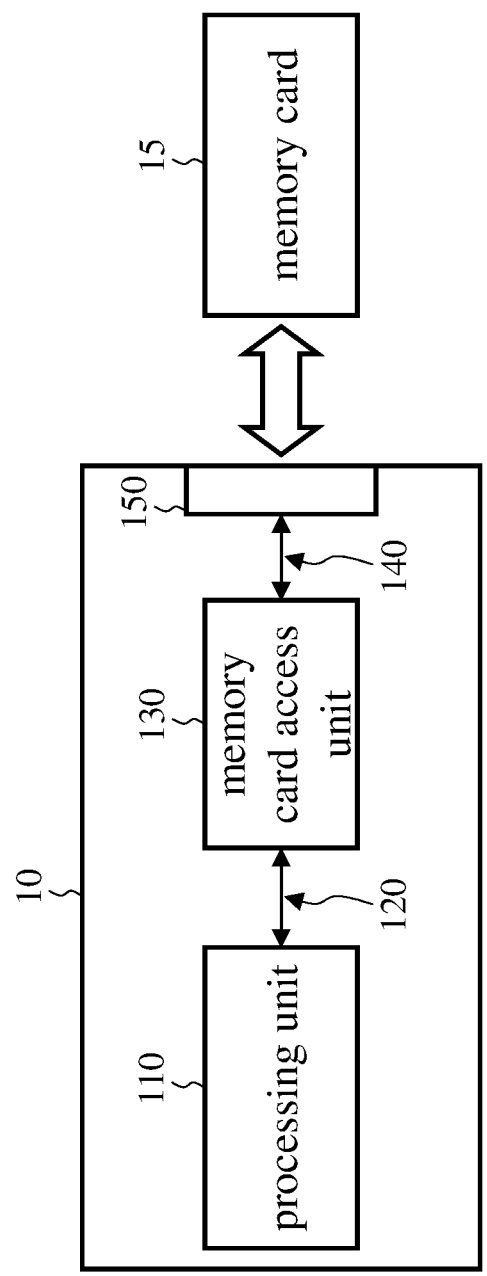
FIG. 1 is a block diagram showing the connection between a memory card and a conventional electronic device.
Figure 2:
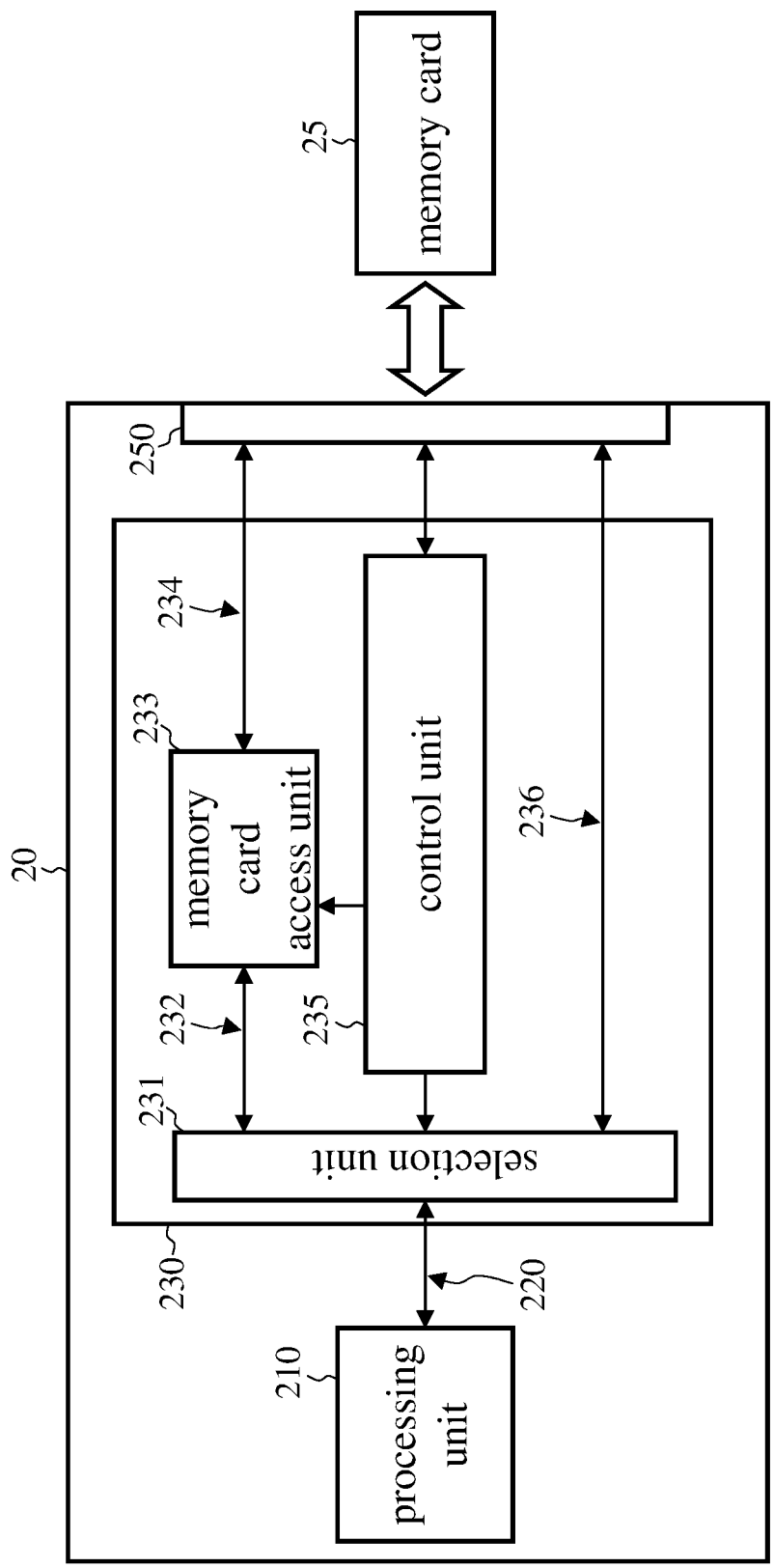
FIG. 2 is a functional block diagram of a memory card access module according to an embodiment of the present invention.

FIG. 2 is a functional block diagram of a memory card access module according to an embodiment of the present invention. The memory card access module 230 is implemented in the electronic device 20 and coupled between the processing unit 210 and the slot 250 of the electronic device 20. The processing unit 210 is a system on chip (SoC) or a chipset of the electronic device 20. For example, the processing unit 210 may be a central processing unit, a microprocessor, or the like. The slot 250 is for the insertion of the memory card 25 or other devices. The memory card access module 230 includes the selection unit 231, the memory card access unit 233, and the control unit 235. The transmission interface 220, the transmission interface 232, and the transmission interface 236 are Peripheral Component Interconnect Express (PCI-Express, PCIe for short) interfaces, whereas the transmission interface 234 is a transmission interface other than the PCIe interface. One function of the memory card access unit 233 is to provide data format conversion between the PCIe interface and the transmission interface, such as a memory card interface including the secure digital (SD) interface, the multimedia card (MMC) interface or the embedded MMC (eMMC) interface. The control unit 235 may be implemented, for example, by a logic circuit or a microcontroller.

In some embodiments, the control unit 235 determines whether the memory card 25 supports the PCIe interface (i.e., PCIe compliant or compatible interface) by sending an SD command complying with an SD protocol to the memory card 25. The SD command for this specific purpose is defined in the SD specification, please refer to Physical Layer Specification of the SD specification version 7.10 (which is free to download on www.sdcard.org/downloads/pls/archives/) for more details. More specifically, reference is made to FIG. 3-24 on page 31 of the SD specification version 7.10 which illustrates SD Express Interface Detection and Initialization Flow that shows CMD8 can be utilized to detect whether the memory card supports PCIe.

In cases where the memory card 25 supports the SD interface but does not supports the PCIe interface, the memory card 25 sends a response to the SD command which indicates that the memory card 25 supports the SD interface but does not supports the PCIe interface. In cases where the memory card 25 supports both the SD interface and the PCIe interface, the memory card 25 sends a response to the SD command which indicates that the memory card 25 supports both the SD interface and the PCIe interface. The control unit 235 can learn the type of the memory card 25 from the response to the SD command. In cases where there is no response to the SD command, it might be an older version SD card, an MMC card or a dummy card.

In other embodiments, the control unit 235 can know whether a memory card inserted is a PCIe memory card by determining whether the voltage of the clock pin request (CLKREQ #) of the PCIe interface has changed. A PCIe memory card is initialized when the PCIe memory card is inserted in the slot 250, and, during the initialization, the PCIe memory card requires an external clock. When the PCIe memory card requests the clock from the host (i.e., the electronic device 20), the voltage of the clock pin changes.

FIGS. 3A to 3D are flowcharts of a memory card access method according to an embodiment of the present invention. The control unit 235 detects whether a memory card is inserted (step S310). In some embodiments, the slot 250 uses a mechanical way to inform the control unit 235 of whether a card is present or not. For example, the detection may be conducted through a card detection pin of the slot 250. When no memory card is inserted, the control unit 235 controls the electronic device 20 to operate in a predetermined state (step S320). More specifically, the predetermined state may be one of the following two states: state (1) in which the transmission interface 220 is in use, that is, the processing unit 210 and the memory card access unit 233 establish a connection or link through the transmission interface 220 and the transmission interface 232; or state (2) in which the transmission interface 220 is not in use, that is, the processing unit 210 does not establish a connection or link with any device through the transmission interface 220.

Figure 3A:
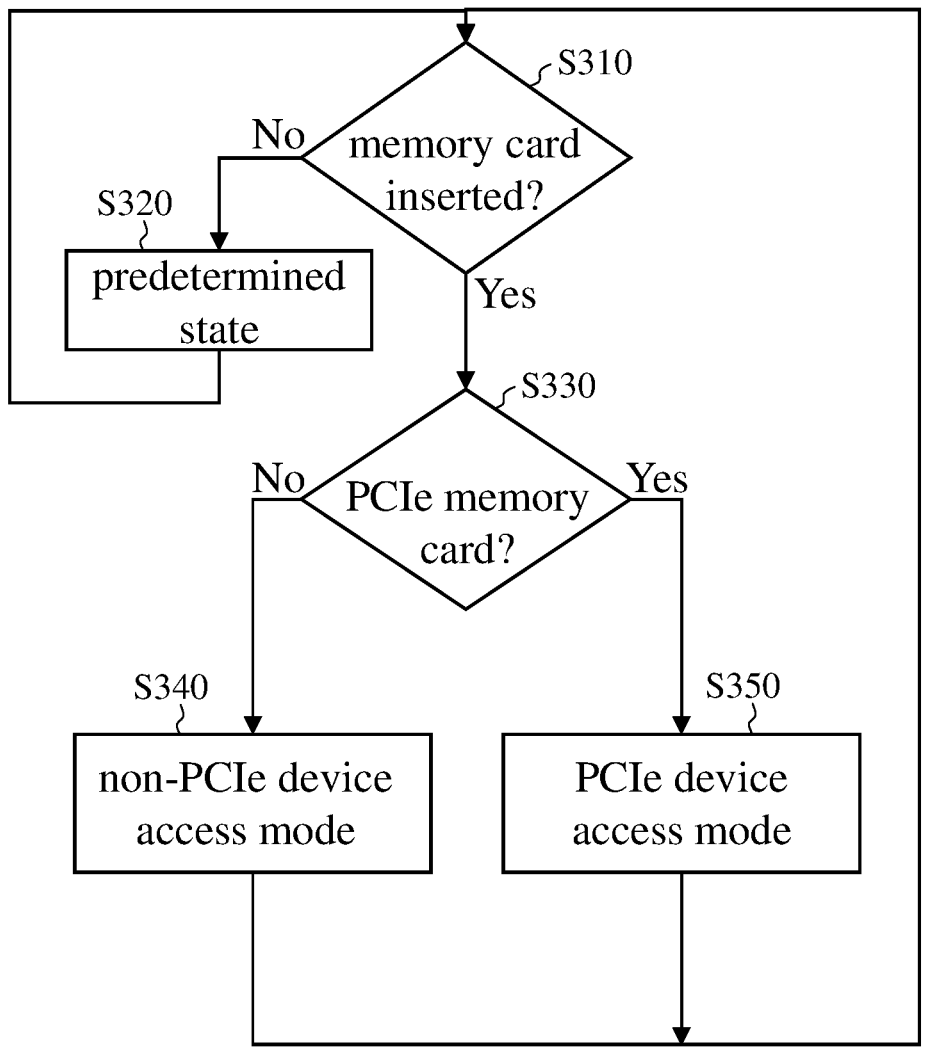
FIGS. 3A to 3G show flowcharts of a memory card access method according to an embodiment of the present invention.
Figure 3B:
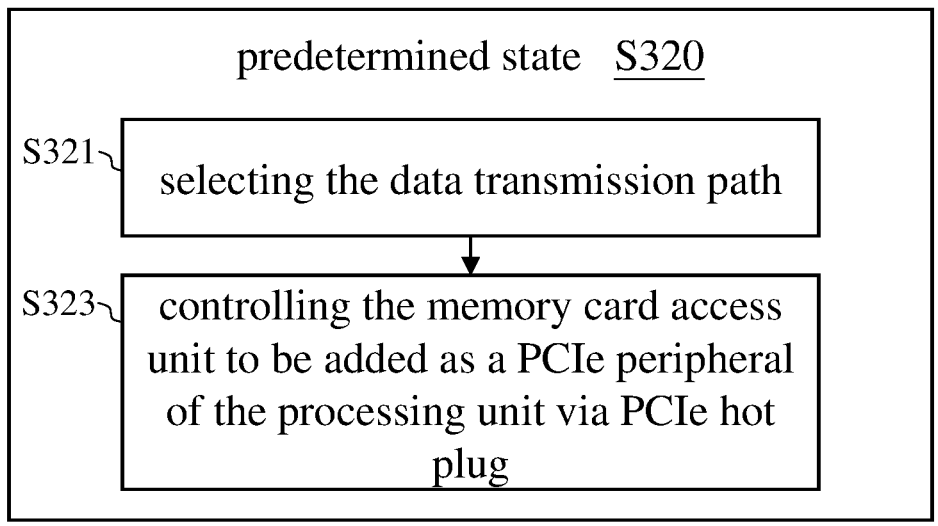
Figure 3C:
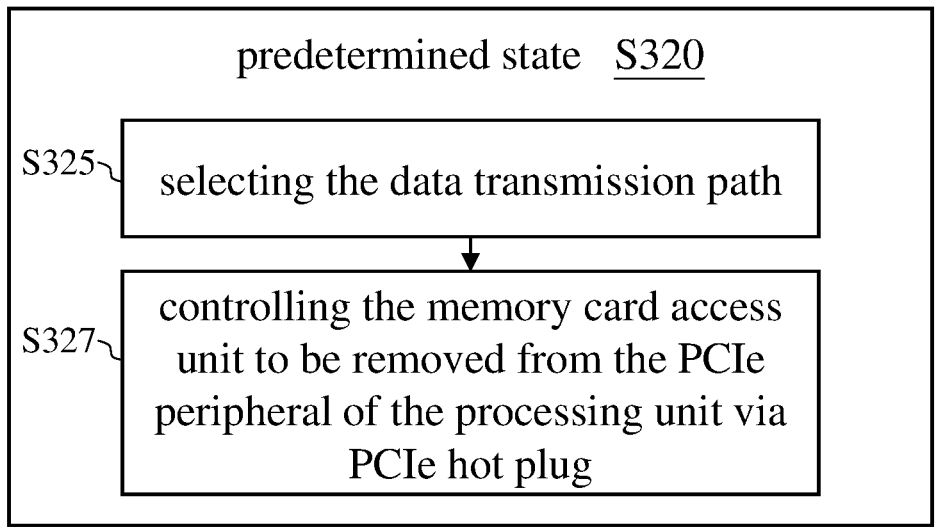

In state (1), the control unit 235 controls the selection unit 231 to select (or activate) the data transmission path (including the transmission interface 232, the memory card access unit 233 and the transmission interface 234) (step S321 in FIG. 3B, the data transmission path becoming active) and controls the memory card access unit 233 to be added as a PCIe peripheral of the processing unit 210 via PCIe hot plug (step S323 in FIG. 3B). When the memory card access unit 233 is added as a PCIe peripheral of the processing unit 210, the processing unit 210 loads or executes the driver of the memory card access unit 233.

Figure 3D:
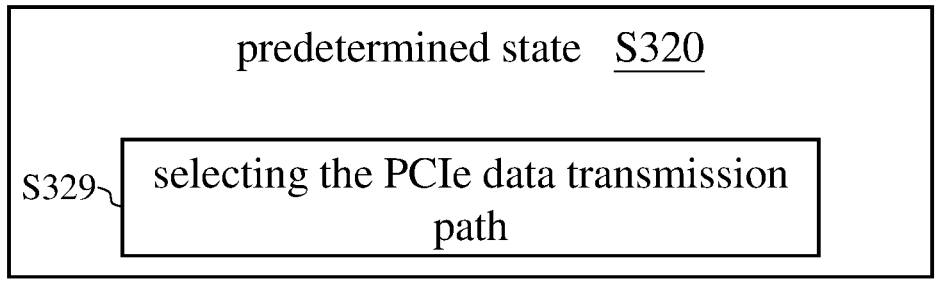
Figure 3E:
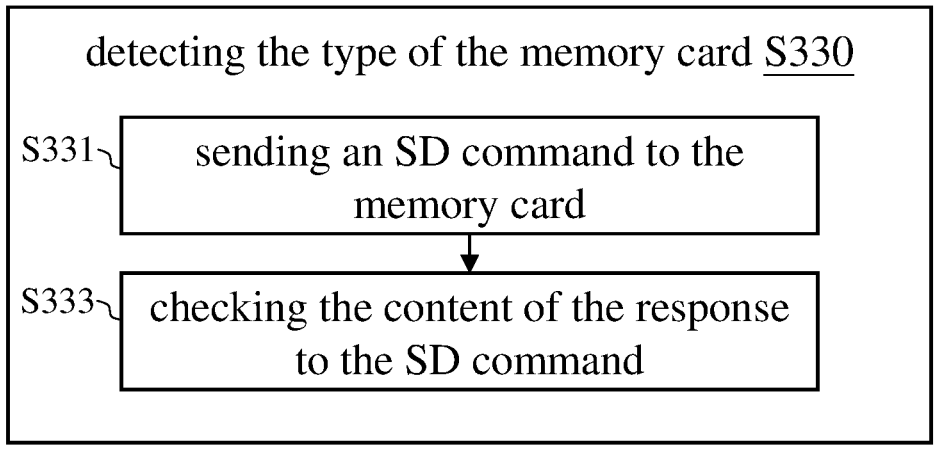

In state (2), the control unit 235 may (A) control the selection unit 231 to select (or activate) the data transmission path (step S325 in FIG. 3C, the data transmission path becoming active) and control the memory card access unit 233 to be removed from the PCIe peripheral of the processing unit 210 via PCIe hot plug (step S327 in FIG. 3C); or (B) control the selection unit 231 to select (or activate) the PCIe data transmission path (including the transmission interface 236) (step S329 in FIG. 3D, the PCIe data transmission path becoming active). Since the transmission interface 220 is not in use, in either case (A) or case (B) the processing unit 210 unloads the driver of the memory card access unit 233 or the driver of the memory card 25 of the PCIe type.

Figure 4:
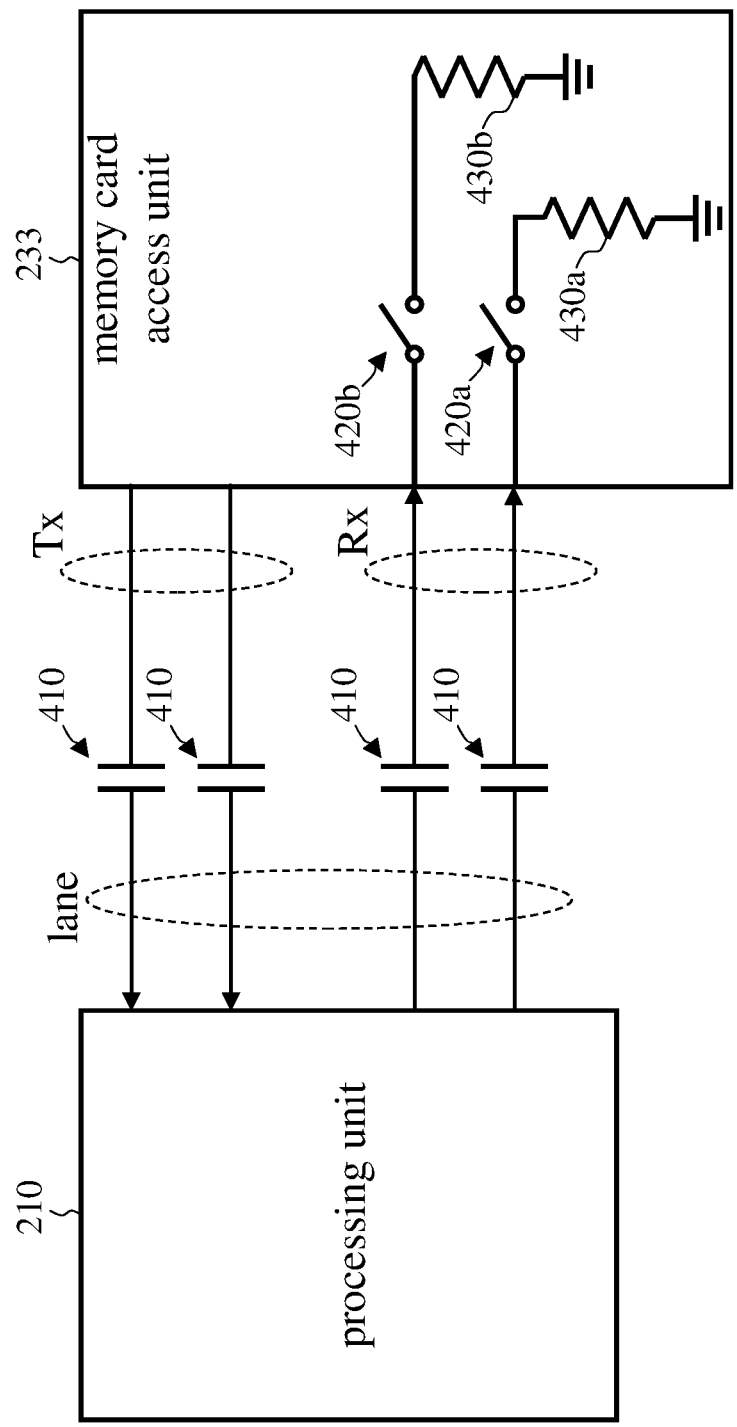
FIG. 4 is a schematic diagram showing the link between the processing unit and the memory card access unit.

Adding the memory card access unit 233 as a PCIe peripheral of the processing unit 210 via PCIe hot plug and removing the memory card access unit 233 from the PCIe peripheral of the processing unit 210 via PCIe hot plug can be realized by controlling the memory card access unit 233 to load or unload its terminal resistor(s). The details of loading and unloading a terminal resistor are discussed below. FIG. 4 is a schematic diagram that illustrates the link between the processing unit 210 and the memory card access unit 233, and exemplarily shows a lane of the PCIe interface. Observe that one lane includes a differential transmission pair Tx and a differential reception pair Rx, in which the transmission and reception are from the viewpoint of the memory card access unit 233. The differential transmission pair Tx and the differential reception pair Rx each include two transmission lines, and each transmission line has a coupling capacitor 410. The memory card access unit 233 includes switches 420a and 420b and resistors 430a and 430b. To load the resistor means that the memory card access unit 233 controls the switches 420a and 420b to turn on according to the control signal of the control unit 235, so that the resistors 430a and 430b are connected to the differential reception pair Rx of the PCIe lane. To unload the resistor means that the memory card access unit 233 controls the switches 420a and 420b to turn off according to the control signal of the control unit 235. Note that if the switches 420a and 420b are originally on, the operation of "to load the terminal resistor" means that the memory card access unit 233 is not required to perform any action (that is, the steps associated with "to load the terminal resistor" can be omitted); likewise, if the switches 420a and 420b are originally off, the operation of "to unload the terminal resistor" means that the memory card access unit 233 is not required to perform any action.

Reference is made back to FIG. 3A. After determining that a memory card is inserted in the slot 250 (i.e., the determination result of step S310 is positive), the control unit 235 further detects the type of the memory card inserted, that is, detects whether the memory card inserted is a PCIe memory card (i.e., a memory card supporting or compatible with the PCIe interface) or an SD memory card only (i.e., a memory card supporting or compatible with the SD interface but not supporting or compatible with the PCIe interface) (step S330). The detail of step S330 in shown in FIG. 3E. The control unit 235 conducts the detection of the type of the memory card 25 by sending the SD command to the memory card 25 (step S331) and then checking the content of the response to the SD command (step S333). The response to the SD command may directly indicate that the memory card 25 is a PCIe memory card or an SD card only.

According to the result of step S330, the control unit 235 determines whether the memory card access module 230 is about to operate in the non-PCIe device access mode or the PCIe device access mode. When the response to the SD command indicates that the memory card is a non-PCIe memory card (i.e., the determination result of step S330 is negative), the control unit 235 controls the memory card access module 230 to operate in the non-PCIe device access mode (step S340) and otherwise controls the memory card access module 230 to operate in the PCIe device access mode (step S350).

Figure 3F:
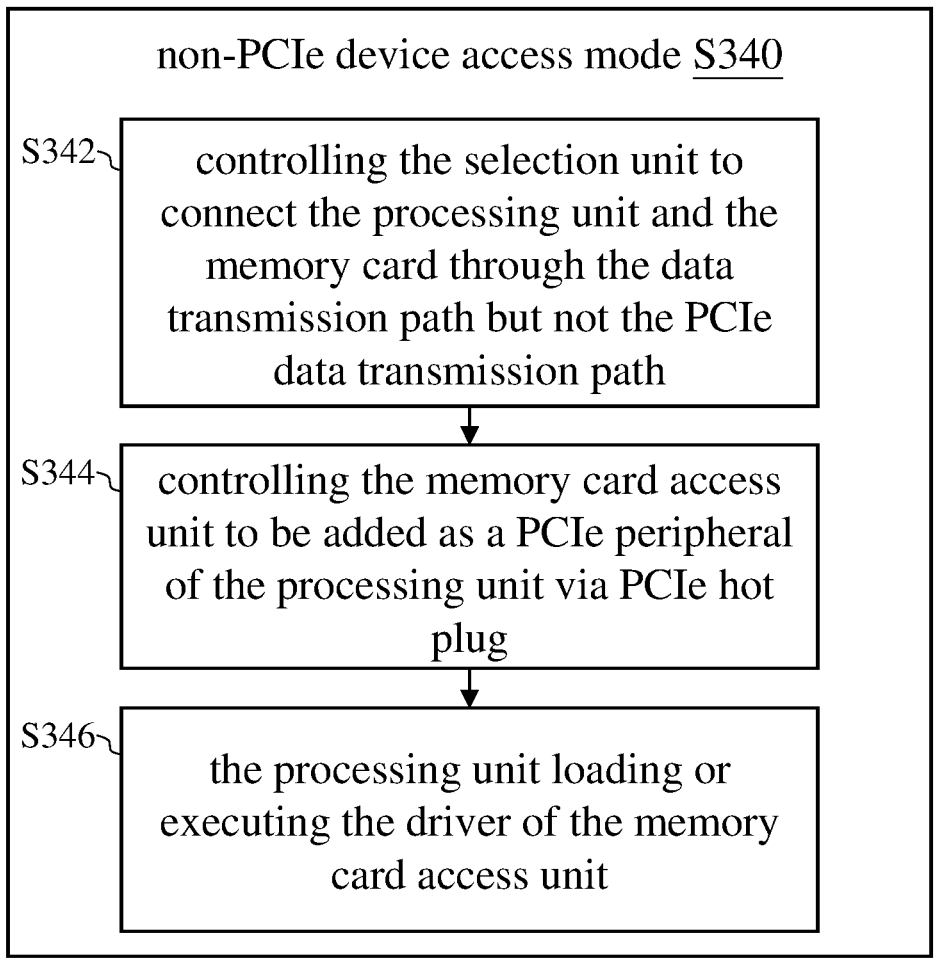

FIG. 3F shows the detail of step S340. In the non-PCIe device access mode, the control unit 235 controls the selection unit 231 to connect the processing unit 210 and the memory card 25 through the data transmission path (i.e., to select or activate the data transmission path) and controls the selection unit 231 not to connect the processing unit 210 with the memory card 25 through the PCIe data transmission path (i.e., to deselect or deactivate the PCIe data transmission path so that the processing unit 210 and the memory card 25 are not electrically coupled to each other through the PCIe data transmission path) (step S342) and controls the memory card access unit 233 to be added as a PCIe peripheral of the processing unit 210 via PCIe hot plug (step S344). That is, in this mode, the data transmission path is established (active) but the PCIe data transmission path is not established (inactive) between the processing unit 210 and the memory card 25. Accordingly, the processing unit 210 loads or executes the driver of the memory card access unit 233 (step S346) and accesses the memory card 25 through the data transmission path rather than the PCIe data transmission path. As a result, data can be transmitted between the processing unit 210 and the memory card access unit 233.

Figure 3G:
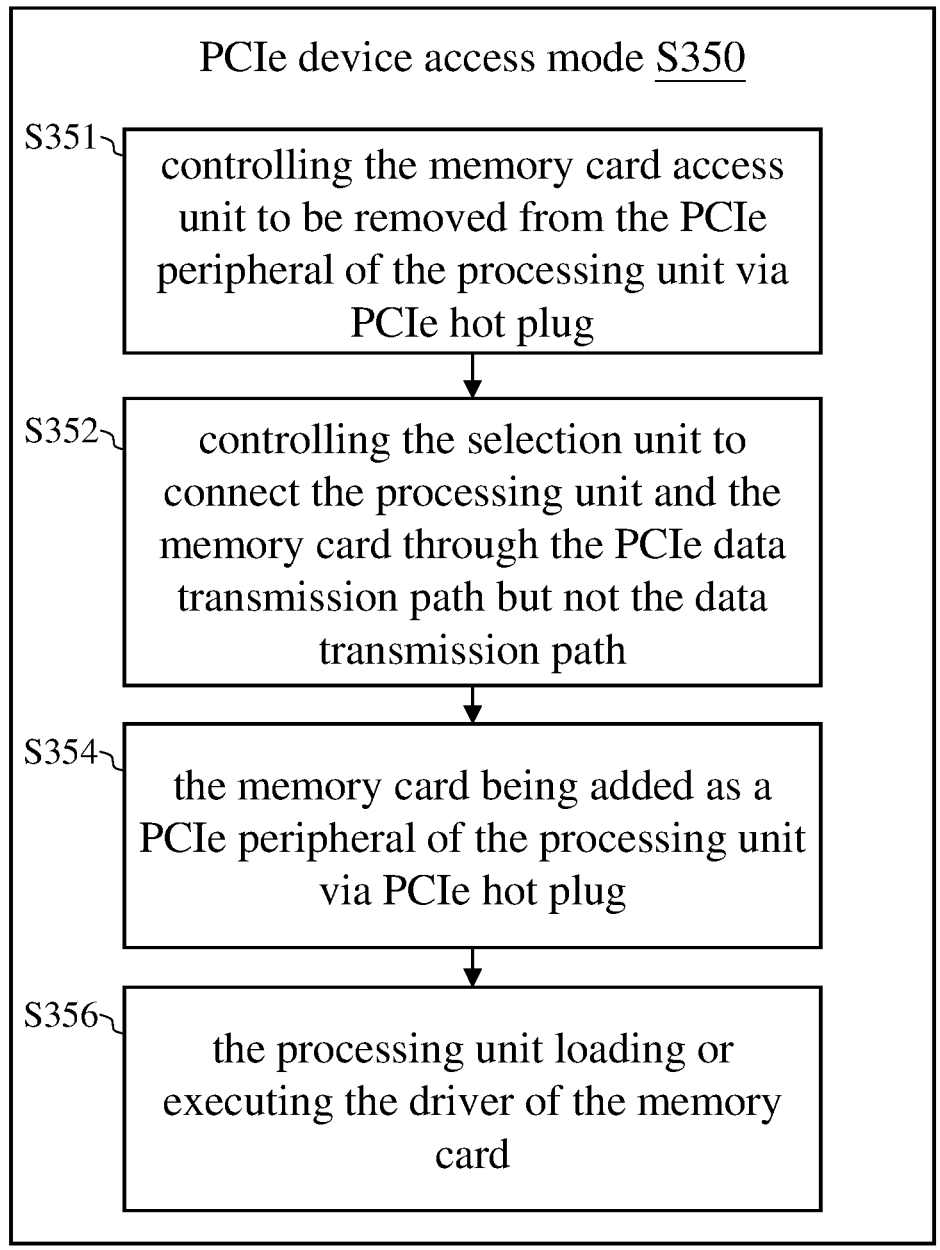

FIG. 3G shows the detail of step S350. In the PCIe device access mode, the control unit 235 first controls the memory card access unit 233 to be removed from the PCIe peripheral of the processing unit via PCIe hot plug (step S351). If, however, the memory card access unit 233 is not a PCIe peripheral of the processing unit when step S350 is being performed (e.g., the transmission interface 220 is not in use in the predetermined state of step S320), step S351 is skipped. Next, the control unit 235 controls the selection unit 231 to connect the processing unit 210 and the memory card 25 through the PCIe data transmission path (i.e., to select or activate the PCIe data transmission path) and controls the selection unit 231 not to connect the processing unit 210 with the memory card 25 through the data transmission path (i.e., to deselect or deactivate the data transmission path so that the processing unit 210 and the memory card 25 are not electrically coupled to each other through the data transmission path) (step S352). That is, in this mode, the PCIe data transmission path is established (active) but the data transmission path is not established (inactive) between the processing unit 210 and the memory card 25. Accordingly, the memory card 25 is added as a PCIe peripheral of the processing unit 210 via PCIe hot plug (step S354), and the processing unit 210 loads or executes the driver of the memory card 25 (step S356) and accesses the memory card 25 through the PCIe data transmission path rather than the data transmission path. As a result, data can be directly transmitted between the processing unit 210 and the memory card 25.

In the non-PCIe device access mode, the processing unit 210 and the memory card 25 are electrically coupled to each other through the data transmission path (i.e., through the transmission interface 220, the selection unit 231, the transmission interface 232, the memory card access unit 233, the transmission interface 234 and the slot 250) only. In the PCIe device access mode, the processing unit 210 and the memory card 25 are electrically coupled to each other through the PCIe data transmission path (i.e., through the transmission interface 220, the selection unit 231, the transmission interface 236 and the slot 250) only. In other words, the processing unit 210 is not electrically coupled to the data transmission path and the PCIe data transmission path at the same time.

In some embodiments, the selection unit 231 is implemented with a multiplexer, which selects either the data transmission path or the PCIe data transmission path, but does not select the data transmission path and the PCIe data transmission path at the same time. When the data transmission path is selected, the processing unit 210 is electrically coupled to the data transmission path and cannot transmit data through the PCIe data transmission path. When the PCIe data transmission path is selected, the processing unit is electrically coupled to the PCIe data transmission path and cannot transmit data through the data transmission path.

Compared to a switch which is an active component that contains one set of upstream transmitter and receiver and multiple sets of downstream transmitter and receiver and establishes multiple connections with a number of devices at the same time, the circuitry and operation of a multiplexer is much simpler because a multiplexer establishes only one connection or link with a device at a time and acts as a passive component that merely passes data through the established connection or link. Due to the absence of transmitters and receivers, there are no complex routings in the multiplexer, and thus the multiplexer is more competitive than the switch in terms of costs and implementation simplicity.

Figure 5:
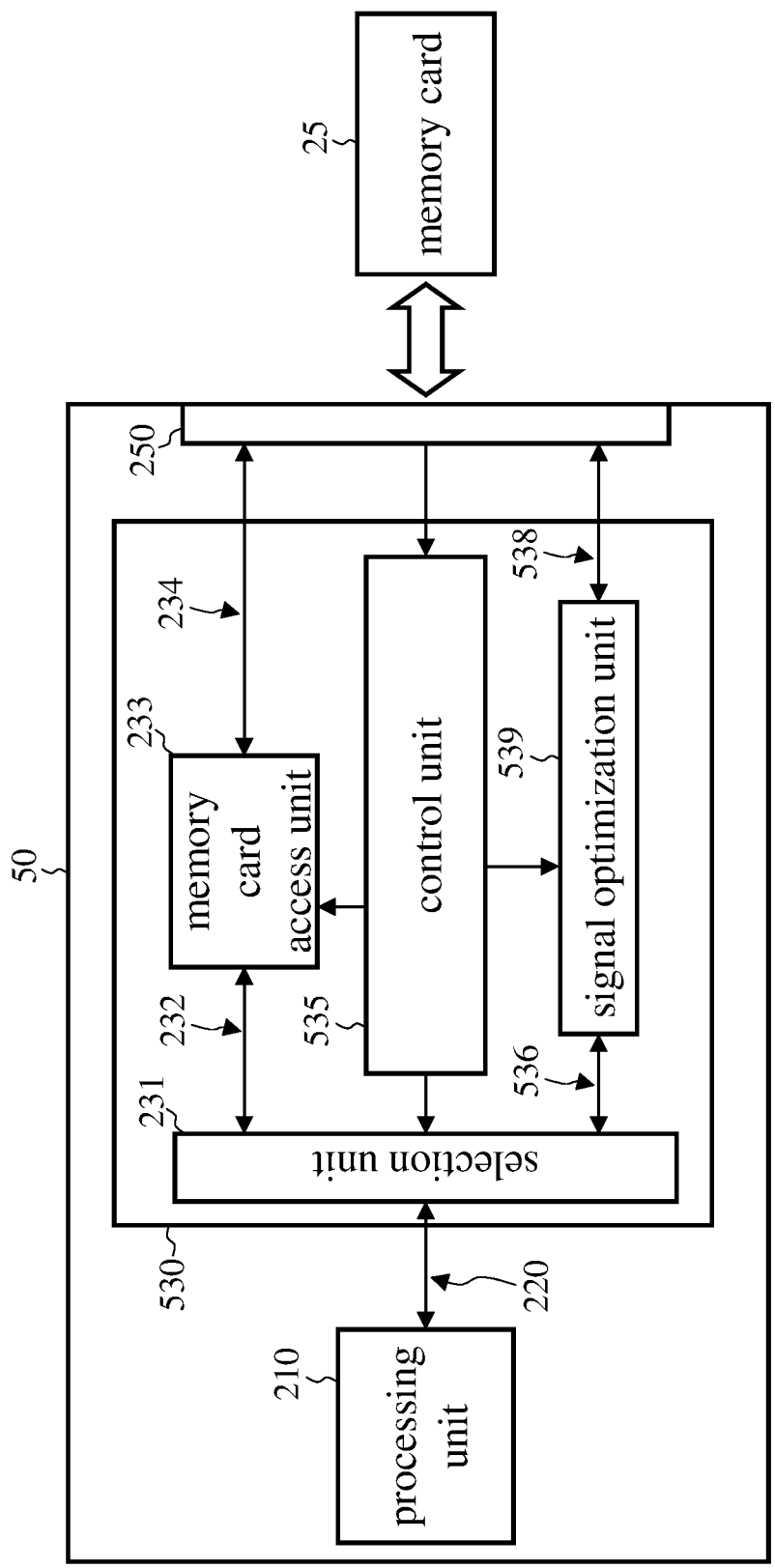
FIG. 5 is a functional block diagram of the memory card access module according to another embodiment of the present invention.
Figure 6A:
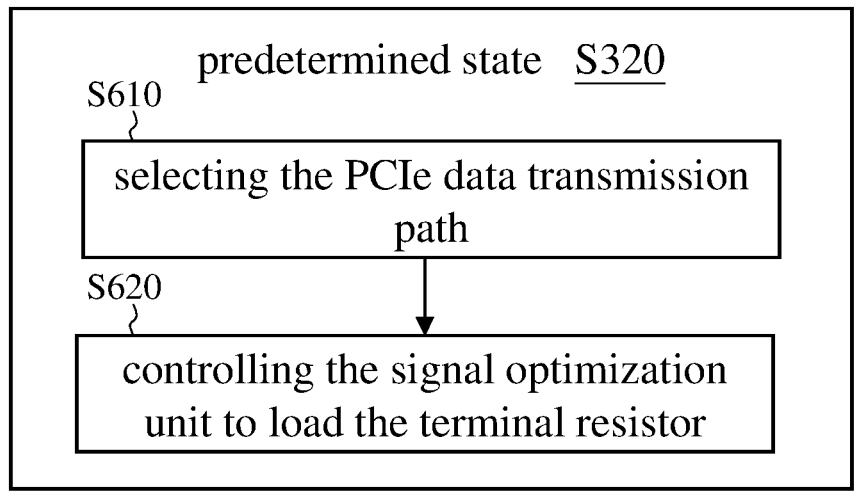
FIGS. 6A to 6B show detailed steps of the memory card access method corresponding to the memory card access module in FIG. 5.
Figure 6B:
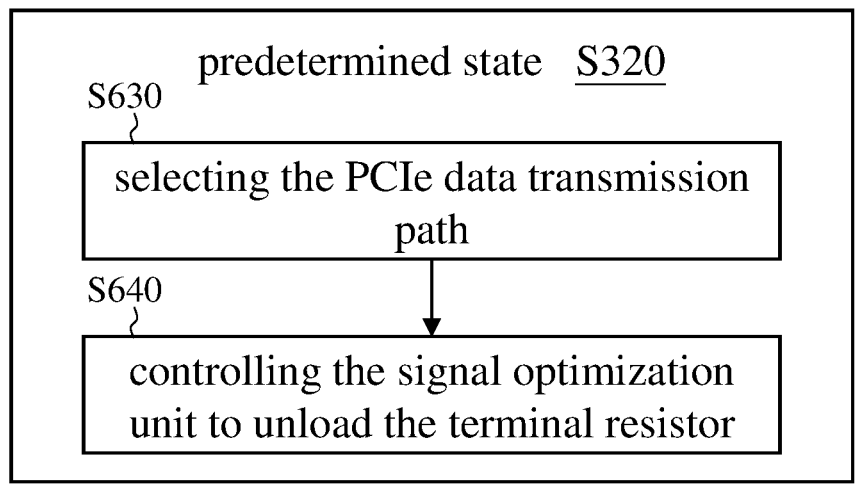

FIG. 5 is a functional block diagram of the memory card access module according to another embodiment of the present invention. The memory card access module 530 is implemented in the electronic device 50 and coupled between the processing unit 210 and the slot 250 of the electronic device 50. The processing unit 210 is an SoC or a chipset of the electronic device 50. The memory card access module 530 includes the selection unit 231, the memory card access unit 233, the control unit 535, and the signal optimization unit 539. The transmission interface 536 and the transmission interface 538 are PCIe interfaces. In FIGS. 2 and 5, elements denoted with the same numerals have the same functions and repeated descriptions are thus omitted for brevity. The control unit 535 can be implemented, for example, by a logic circuit or a microcontroller.

Since the memory card 25 and the slot 250 may reduce the performance of data transmission or even cause access errors due to poor contact or terminal oxidation, this embodiment employs the signal optimization unit 539 to perform enhancement (e.g. redriver) and/or retimer on the signals transmitted between the memory card 25 and the processing unit 210, or to add protocol aware and/or other protocol analyzing processes to adjust the protocol content. In accordance with this embodiment, step S320 of FIG. 3 is slightly modified.

For step S320, in state (1) (i.e., the transmission interface 220 is in use), the control unit 535 may (A) (corresponding to FIG. 3B) control the selection unit 231 to select the data transmission path (including the transmission interface 232, the memory card access unit 233 and the transmission interface 234) and control the memory card access unit 233 to be added as a PCIe peripheral of the processing unit 210 via PCIe hot plug; or (B) (corresponding to FIG. 6A) control the selection unit 231 to select the PCIe data transmission path (including the transmission interface 536, the signal optimization unit 539 and the transmission interface 538) (step S610) and control the signal optimization unit 539 to load the terminal resistor (step S620). In state (2) (i.e., the transmission interface 220 is not in use), the control unit 535 may (A) (corresponding to FIG. 3C) control the selection unit 231 to select the data transmission path and control the memory card access unit 233 to be removed from the PCIe peripheral of the processing unit 210 via PCIe hot plug; or (B) (corresponding to FIG. 6B) control the selection unit 231 to select the PCIe data transmission path (step S630) and control the signal optimization unit 539 to unload the terminal resistor (step S640).

The signal optimization unit 539 may be, for example, a redriver circuit and/or a retimer circuit. Note that the signal optimization unit 539 is transparent. That is, the signal optimization unit 539 does not function as a PCIe component to the processing unit 210. Therefore, the memory card 25 can be directly added as a PCIe peripheral of the processing unit via PCIe hot plug.

Figure 7A:
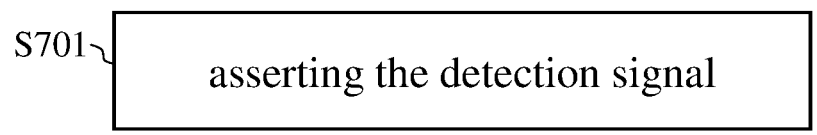
FIGS. 7A to 7B show the details of adding/removing the memory card access unit to/from a PCIe peripheral of the processing unit.
Figure 7B:
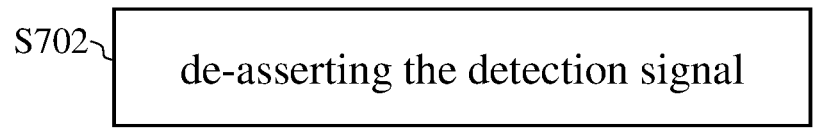

FIG. 7A shows an embodiment of adding the memory card access unit 233 as a PCIe peripheral of the processing unit 210 via PCIe hot plug (i.e., step S701 is an embodiment of steps S323 and S344), and FIG. 7B shows an embodiment of removing the memory card access unit 233 from the PCIe peripheral of the processing unit 210 via PCIe hot plug (i.e., step S702 is an embodiment of steps S327 and S351). In some embodiments, when the selection unit 231 selects the data transmission path, a connection or link between the processing unit 210 and the memory card access unit 233 is established, and a detection signal is transmitted to the processing unit 210 by the control unit 235 or 535. In step S701 of FIG. 7A, the control unit 235 or 535 controls the memory card access unit 233 to be added as a PCIe peripheral of the processing unit 210 by asserting the detection signal. In step S702 of FIG. 7B, the control unit 235 or 535 controls the memory card access unit 233 to be removed from the PCIe peripheral of the processing unit 210 by de-asserting the detection signal.

In some embodiments, in the PCIe device access mode (step S350), the control unit 235 or 535 controls the memory card 25 to be added as a PCIe peripheral of the processing unit 210 by asserting the detection signal (step S354). In addition, when a PCIe memory card is removed from the slot 250, the control unit 235 or 535 controls the PCIe memory card to be removed from the PCIe peripheral of the processing unit 210 by de-asserting the detection signal.

Figure 8A:
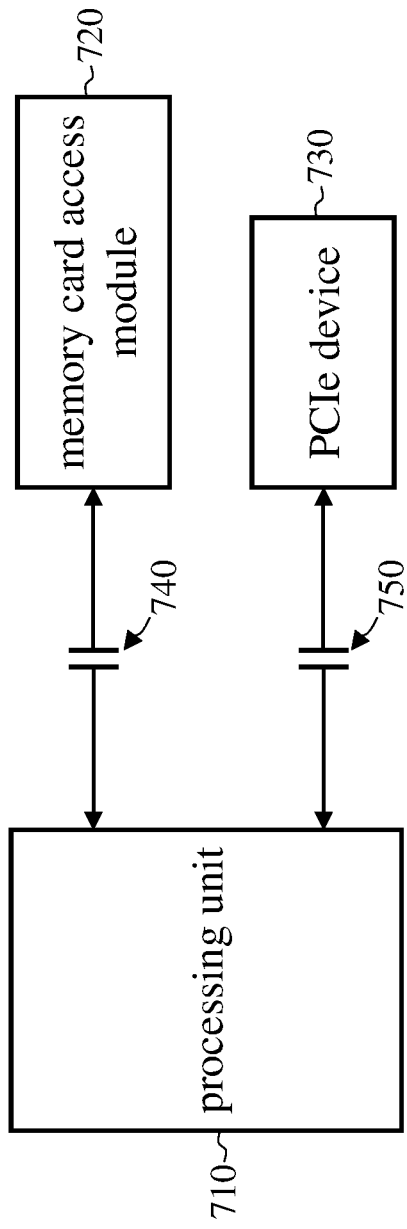
FIGS. 8A to 8B illustrate schematic diagrams showing the sharing of the coupling capacitors of the PCIe interface.
Figure 8B:
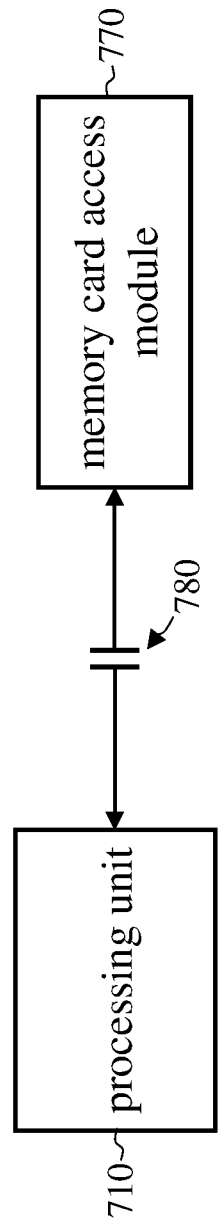

In summary, the memory card access module of the present invention integrates the transmission interfaces of the PCIe memory card and the non-PCIe memory card to provide greater flexibility for the manufacturer of the electronic device in planning the PCIe lanes of the processing unit (i.e., no need to sacrifice other PCIe devices to support two types of memory cards at the same time or no need to integrate other interfaces by making use of many discrete components), as well as to provide users with more user-friendly operations (i.e., both types of memory cards can be inserted in the same memory card slot). In addition, the present invention further makes it possible for the manufacturer of the electronic device to save the coupling capacitors on the circuit, so as to reduce the cost and simplify the design. Specifically, as shown in FIGS. 8A and 8B, when the PCIe interface is not shared (FIG. 8A), the memory card access module 720 and the PCIe device 730 each occupy a PCIe interface of the processing unit, which may include one or more lanes, and each PCIe interface contains a capacitor group 740 or 750. When the PCIe interface is shared (FIG. 8B) (i.e., like the memory card access module 230 of FIG. 2 or the memory card access module 530 of FIG. 5, the memory card access module 770 supports both PCIe devices (including PCIe memory cards) and non-PCIe memory cards), only one capacitor group 780 is needed; that is, the number of capacitors required can be halved, as compared to the case of FIG. 8A.

According to the present invention, the sharing of PCIe interfaces is not limited to PCIe memory cards. Any PCIe device that can be connected to the electronic device through the slot of the electronic device is within the scope of the present invention.

The processing units 210 and 710, the memory card access unit 233, the memory card access modules 230, 530, 720 and 770, the selection unit 231, the control units 235 and 535, and the signal optimization unit 539 can be implemented by hardware (e.g., circuits including active and/or passive electronic components). The control units 235 and 535 can be implemented by a digital circuit, a microcontroller or a microprocessor, which in some embodiments may be integrated in other circuits.

Since people of ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A memory card access device, coupled between a processing unit and a memory card slot and used for accessing a memory card, the memory card access device comprising:
   a selection unit;
   a data transmission path between the selection unit and the memory card slot;
   a Peripheral Component Interconnect Express (PCIe) data transmission path that is between the selection unit and the memory card slot and does not include a conversion circuit;
   a memory card access unit, disposed on the data transmission path and configured to access the memory card and to provide data format conversion between a transmission interface and a PCIe interface; and
   a control unit, coupled to the memory card access unit and the selection unit;
   wherein the control unit is used for
      determining whether the memory card supports the PCIe interface;
      controlling the selection unit to connect the processing unit and the memory card through the PCIe data transmission path rather than the data transmission path when the memory card supports the PCIe interface; and
      controlling the selection unit to connect the processing unit and the memory card through the data transmission path rather than the PCIe data transmission path when the memory card does not support the PCIe interface;
   wherein the processing unit is not electrically coupled to the data transmission path and the PCIe data transmission path at the same time;
   wherein the memory card access unit comprises a terminal resistor which is inside the memory card access unit, and the control unit controls the memory card access unit to unload the terminal resistor when the memory card is inserted in the memory card slot and the control unit determines that the memory card supports the PCIe interface.

2. The memory card access device of claim 1, wherein the transmission interface is a secure digital (SD) interface, a multimedia card (MMC) interface or an embedded MMC (eMMC) interface.

3. The memory card access device of claim 1, wherein the control unit determines whether the memory card supports the PCIe interface by sending a secure digital (SD) command complying with an SD protocol to the memory card.

4. The memory card access device of claim 3, wherein the selection unit is a multiplexer, and the control unit controls the multiplexer not to connect the processing unit with the memory card through the data transmission path when a response to the SD command indicates that the memory card supports the PCIe interface.

5. The memory card access device of claim 3, wherein the selection unit is a multiplexer, and the control unit controls the multiplexer not to connect the processing unit with the memory card through the PCIe data transmission path when a response to the SD command indicates that the memory card does not support the PCIe interface.

6. The memory card access device of claim 3, wherein when a response to the SD command indicates that the memory card does not support the PCIe interface, the control unit controls the memory card access unit to be added as a PCIe peripheral of the processing unit via PCIe hot plug by loading the terminal resistor of the memory card access unit.

7. The memory card access device of claim 1, wherein the control unit controls the selection unit to select the PCIe data transmission path when there is no memory card inserted in the memory card slot.

8. The memory card access device of claim 1, wherein the control unit controls the selection unit to select the data transmission path when there is no memory card inserted in the memory card slot.

9. The memory card access device of claim 8, wherein when there is no memory card inserted in the memory card slot, the control unit removes the memory card access unit from a PCIe peripheral of the processing unit via PCIe hot plug by unloading the terminal resistor of the memory card access unit.

10. The memory card access device of claim 1, wherein the processing unit is not electrically coupled to the memory card access unit and the PCIe data transmission path at the same time.

11. A memory card access method applied to an electronic device, a processing unit of the electronic device being able to access a memory card via a memory card slot, and the electronic device comprising a data transmission path and a Peripheral Component Interconnect Express (PCIe) data transmission path, the method comprising:
   detecting whether the memory card supports a PCIe interface;
   connecting the processing unit and the memory card through the PCIe data transmission path rather than the data transmission path when the memory card supports the PCIe interface;
   connecting the processing unit and the memory card through the data transmission path on which a memory card access unit is disposed rather than the PCIe data transmission path when the memory card does not support the PCIe interface, wherein the memory card access unit comprises a terminal resistor which is inside the memory card access unit;
   controlling the memory card access unit to conduct data format conversion between a transmission interface and the PCIe interface when the memory card does not support the PCIe interface; and
   controlling the memory card access unit to unload the terminal resistor when the memory card is inserted in the memory card slot and the memory card supports the PCIe interface;
   wherein the processing unit is not electrically coupled to the data transmission path and the PCIe data transmission path at the same time, and the PCIe data transmission path does not include a conversion circuit.

12. The method of claim 11, wherein the step of detecting whether the memory card supports the PCIe interface includes sending a secure digital (SD) command complying with an SD protocol to the memory card.

13. The method of claim 12, further comprising:
   controlling the memory card access unit to be added as a PCIe peripheral of the processing unit via PCIe hot plug when a response to the SD command indicates that the memory card does not support the PCIe interface by loading the terminal resistor of the memory card access unit.

14. A memory card access device, coupled between a processing unit and a memory card slot and used for accessing a memory card, the memory card access device comprising:
   a selection unit;
   a data transmission path between the selection unit and the memory card slot;
   a Peripheral Component Interconnect Express (PCIe) data transmission path that is between the selection unit and the memory card slot and does not include a conversion circuit;
   a memory card access unit, disposed on the data transmission path and configured to access the memory card and to provide data format conversion between a transmission interface and a PCIe interface; and
   a control unit, coupled to the memory card access unit and the selection unit;
   wherein the control unit is used for
      determining whether the memory card supports the PCIe interface;
      controlling the selection unit to connect the processing unit and the memory card through the PCIe data transmission path rather than the data transmission path when the memory card supports the PCIe interface; and
      controlling the selection unit to connect the processing unit and the memory card through the data transmission path rather than the PCIe data transmission path when the memory card does not support the PCIe interface;
   wherein the processing unit is not electrically coupled to the data transmission path and the PCIe data transmission path at the same time;
   wherein the memory card access unit comprises a terminal resistor which is inside the memory card access unit, and the control unit controls the memory card access unit to load the terminal resistor when there is no memory card inserted in the memory card slot or when the memory card is inserted in the memory card slot and the control unit determines that the memory card does not support the PCIe interface.

15. The memory card access device of claim 14, wherein the transmission interface is a secure digital (SD) interface, a multimedia card (MMC) interface or an embedded MMC (eMMC) interface.

16. The memory card access device of claim 14, wherein the control unit determines whether the memory card supports the PCIe interface by sending a secure digital (SD) command complying with an SD protocol to the memory card.

17. The memory card access device of claim 16, wherein the selection unit is a multiplexer, and the control unit controls the multiplexer not to connect the processing unit with the memory card through the PCIe data transmission path when a response to the SD command indicates that the memory card does not support the PCIe interface.

18. The memory card access device of claim 16, wherein when a response to the SD command indicates that the memory card does not support the PCIe interface, the control unit controls the memory card access unit to be added as a PCIe peripheral of the processing unit via PCIe hot plug by loading the terminal resistor of the memory card access unit.

19. The memory card access device of claim 14, wherein the control unit controls the selection unit to select the PCIe data transmission path when there is no memory card inserted in the memory card slot.

20. The memory card access device of claim 14, wherein the control unit controls the selection unit to select the data transmission path when there is no memory card inserted in the memory card slot.

* * * * *